United States Patent [19]

French et al.

[11] 4,275,050
[45] Jun. 23, 1981

[54] PRODUCTION OF ULTRA-HARD PARTICLES

[75] Inventors: Frederic A. French; Douglas A. French, both of Portola Valley, Calif.

[73] Assignee: TDC-Technology Development Corporation, Vancouver, Canada

[21] Appl. No.: 92,485

[22] Filed: Nov. 8, 1979

[51] Int. Cl.$^3$ .............................................. C01B 31/00
[52] U.S. Cl. ..................................... 423/445; 51/307; 423/446; 423/466; 423/496
[58] Field of Search .................. 106/43; 423/446, 445, 423/122, 126, 135, 462, 466, 495, 496, 134

[56] References Cited

U.S. PATENT DOCUMENTS

| | | | |
|---|---|---|---|
| 2,525,830 | 10/1950 | Sailors et al. | 423/122 |
| 3,268,457 | 8/1966 | Giardini et al. | 423/446 X |
| 3,362,788 | 1/1968 | Lauer | 423/446 |
| 3,630,679 | 12/1971 | Angus | 423/446 |

Primary Examiner—Helen M. McCarthy
Attorney, Agent, or Firm—Limbach, Limbach & Sutton

[57] ABSTRACT

The production of an ultra-hard particle composed substantially of carbon as the dominant element is taught. The ultra-hard particle is the product of the reaction of a metal carbide selected from the group consisting of $Al_4C_3$ and $Be_2C$ with a member selected from the group consisting of $CH_nX_AY_{(4-n)-A'}$ $C_2H_{n'}X_{A'}Y_{(6-n')-A'}$, $C_2H_{n''}X_{A''}Y_{(4-n'')-A''}$ and $X_2$ wherein X and Y are different halogens selected from the group consisting of chlorine, bromine, iodine and fluorine, and wherein A is an integer from 0 to 4, A' is an integer from 0 to 6 and A'' is an integer from 0 to 4, and wherein n is an integer from 0 to 4, n' is an integer from 0 to 6 and n'' is an integer from 0 to 4, wherein A, A', A'', n, n' or n'' is the same integer in any particular member selected and wherein $n+A=4$, $n'+A'=6$ and $n''+A''=4$.

8 Claims, No Drawings

PRODUCTION OF ULTRA-HARD PARTICLES

BACKGROUND OF THE INVENTION

Numerous attempts were made prior to 1955 to convert various forms of carbon, including graphite, into its diamond form or other ultra-hard carbonaceous forms. None of these attempts have been adequately substantiated. A valid diamond synthesis was reported in 1955 but details were not revealed until 1959 (Nature 184:1094–8, 1959). At temperatures of 1200° to 2400° C. and pressures ranging from 55,000 to 100,000 atmospheres or more, carbon is converted into its diamond form in the presence of transition metals (chromium, manganese, iron, cobalt, nickel, ruthenium, rhodium, palladium, osmium, iridium and platinum) or tantalum. Higher pressures are required at higher temperatures.

Rather esoteric means were also investigated in the guest for a more convenient graphite to diamond conversion. As reported in Phys. Rev. Letters 7:367 (1961), it was taught that diamond might be obtained in less than a microsecond by the action of extremely high pressure explosive shock waves on graphite. In fact, diamonds were actually recovered from carbon subjected to an explosive shock.

Epitaxial methods have also been reported where the decomposition of gases, such as methane, ethane and propane in contact with diamond powder was found to promote diamond growth. However, in performing epitaxial techniques, temperatures in the vicinity of 1300° K. and pressures on the order of $10^{-3}$ to $10^{-4}$ atmospheres were found to be required.

It is obvious that the prior techniques employed in the fabrication of synthetic diamonds and other ultra-hard cabonaceous materials are at best cumbersome and expensive to carry out. The maintenance of any extremes in temperature and pressure requires enormous energy and sophisticated equipment, which in turn detracts from the widespread commercialization of synthetic diamond fabrication.

SUMMARY OF THE INVENTION

It is an object of the present invention to produce ultra-hard carbonaceous particles while eliminating the drawbacks experienced in prior art production techniques.

It is a further object of the present invention to produce ultra-hard carbonaceous particles without the necessity for employing extreme temperatures and pressures which are required by the prior art.

It is yet a further object of the present invention to produce ultra-hard carbonaceous particles from sources other than graphite or amorphous carbon.

It is yet a further object of the present invention to produce ultra-hard carbonaceous particles by means of high thermodynamic drive carbon yielding reactions.

It has been found that ultra-hard carbonaceous particles can be produced from the reaction of a metal carbide such as aluminum carbide ($Al_4C_3$) or beryllium carbide ($Be_2C$) when reacted with halogens and related halocompounds. Care has been exercised to minimize or eliminate the presence of substances which would react parasitically with carbon or the reactants, such as oxygen nd oxygenated compounds with oxidizing power. The reactions have tended to produce very hard and strong, covalently bonded lattice structures under highly exothermic conditions at moderate temperatures. The reactions have been accomplished at relatively low temperatures (a few hundred degrees C.) and at low pressures (a few atmospheres or less). It has also been an objective to employ a system having no solvency capability for carbon while carrying out the reactions of the present invention at favorable (spontaneous) energies on the order of 100 times as great or greater, per gram atom, as the diamond-graphite interconversion energy. Under proper conditions, the metal carbides are quite reactive having carbon atoms that are individually isolated. In actual reactions which have been carried out, the reaction energy has been found to be enormously favorable and more than 100 times as great per carbon atom as the graphite-carbon interconversion energy.

It has been found that the aluminum carbide or the beryllium carbide used in the invention must be relatively free of impurities, particularly carbon. If free carbon is present in the metal carbide, graphite nucleation may occur and this greatly diminishes the yield of ultra-hard carbon particles. For this reason, aluminum carbide or beryllium carbide starting materials are selected which possess slightly greater stoichiometric aluminum or beryllium to carbon ratios than are indicated by the formulae $Al_4C_3$ or $Be_2C$. The physical forms of the aluminum carbide or beryllium carbide are not absolutely critical in carrying out the present invention. However, the various reactions occur more rapidly with finely divided particles in the 50–500 mesh range.

The reaction is carried out in a hot melt system. The melt system is comprised of a molten solution of more than one metal halide wherein the metals are selected from the group consisting of Groups I, II and III of the periodic table and the halides are selected from the group consisting of chlorine, bromine, iodine and fluorine. The presence of oxidizing anions such as sulfates, nitrates and carbonates and hydrogen containing anions such as hydroxides should be avoided in the melt system.

The melt system performs several valuable functions in carrying out the present invention. Firstly, it provides for a reaction medium at a temperature substantially below temperatures at which diamond to graphite reversion occurs at a measurable rate. Secondly, it acts a a heat sink. For example, a melt system comprised of lithium chloride (LiCl) combined with aluminum chloride ($AlCl_3$) is fluid at a temperature as low as 150° C. Ideally, the melt system can be composed of an aluminum halide ($AlX_3$, where X represents Cl, Br or I although some F may also be present), complexed with one or more metallic halides such as alkaline halides and alkaline earth halides. When lithium chloride is used with aluminum chloride at a molar ratio $LiCl:AlCl_3$ greater than one, the predominant melt species are $Li^+$, $AlCl_4^-$, and $Cl^-$. If the ratio is high, a solid LiCl phase or $Li_3AlCl_6$ may be present. If the molar ratio of $LiCl:AlCl_3$ is less than 1:1, including as high as approximately 1:2, the predominant melt species are $Li^+$, $AlCl_4^-$, and $Al_2Cl_7^-$. Br may be substituted wholly or partially for Cl. Some fluorine, iodide or iodine may be present in free form or in the aluminum-containing anions in either the initial melt or the final melt system. Such a melt system also exhibits substantial solvent and penetrant capability for $Al_2O_3$ and hydroxy aluminous complexes which naturally form on the surface of aluminum or aluminum carbide in the presence of oxygen or water. A coating of $Al_2O_3$, or bound aluminum atoms bearing OH groups, is extremely tenacious and provides a substantial barrier to the carrying out of the present invention. Thus, the melt system, to function in the present invention, must have solvency capability for aluminum oxide, aluminum oxygen complexes and hydrogen-containing aluminum oxygen complexes. The melt system must also have the ability to wet the metal carbide surface and must have the ability not to destroy the carbon halide reactants or the metal carbide. It must also be substantially anhydrous and substantially free of hydroxyl groups.

The present invention can be carried out at pressures between approximately 0.1 to 100 atmospheres. As an upper limit, the reaction should take place at a pressure less than the pressure where diamond would be the stable form of carbon if the reaction was allowed to reach equilibrium, approximately 20,000 atmospheres. However, above 100 atmospheres, there is little benefit to the reaction while rather sophisticated equipment is necessary to maintain such high pressures. The optimum temperature range would depend upon the actual compounds used to make up the melt and as primary reactants. As a general rule, temperatures between approximately 100° to 700° C. are to be used in carrying out the reaction noting that the temperature must be high enough to at least maintain the melt system in a liquid or gaseous state.

The following examples demonstrate a number of specific embodiments of the invention.

EXAMPLE 1

The melt system is formed by the preparation of a solution of mixed halides which are heated for a sufficient time to insure that substantially all hydrogen and hydrogen chloride have been purged from the system. In this example, 24.5 gms of anhydrous LiCl was heated in a 500 ml flask at approximately 130°–140° C. for two days. Approximately 67 gms of anhydrous $AlCl_3$ was then added under an argon blanket, the temperature elevated to approximately 250° C. and the mixture stirred for 35 minutes at which time very little HCl was evident.

After the melt system was formed, the metal carbide was added. In this example, 2.9 g of $Al_4C_3$ was added and held briefly. The halogen-containing reactant can then be added to the suspension by stepwise additions until an excess is present. In this example, 1 ml portions of $CCl_4$ were added every ten minutes to a total of 10 mls followed by a further 2 ml additions at ten minute intervals. The temperature was maintained at approximately 265° C. throughout the $CCl_4$ additions and the suspension allowed to cool slightly thereafter.

The melt suspension which was formed according to the following reaction:

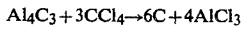

$Al_4C_3 + 3CCl_4 \rightarrow 6C + 4AlCl_3$ was washed by incorporating the suspension in 100 mls of concentrated HCl and 200 mls $H_2O$. The suspension was boiled for 50 minutes. Alternatively, this suspension could have been incorporated in aqueous solutions of non-oxidizing acids such as $H_2SO_4$ or $CH_3SO_3H$ or even nonaqueous systems such as nitrobenzene. The suspension was then filtered and the solids washed in 100 mls of 1:10 HCl followed by three 100 ml water additions, two 40 ml isopropyl alcohol washes, and concluding by four 25 ml acetone washes. The product was dried, resulting in ultra-hard carbonaceous particles.

EXAMPLE 2

To the same melt system as developed in Example 1 was added, in addition to the aluminum carbide, approximately 2 g of KBr. $CCl_4$ remained as the halogen reactant and was added in a stepwise fashion much as was done in Example 1. The final ultra-hard carbonaceous product was washed and dried, again, as was done in Example 1.

EXAMPLE 3

The melt system was the same as Example 1 while the reactants included aluminum carbide and $CBr_4$. More specifically, after the $Al_4C_3$ was added to the hot melt, 1 g of $CBr_4$ was added followed by 10 mls of $CCl_4$ in 0.5 ml portions every five minutes. The ultra-hard carbonaceous product was washed as done in Example 1.

EXAMPLE 4

The melt system was prepared as in Example 1 and aluminum carbide was chosen as a first reactant. The remaining reactants included 1 g of $CBr_4$ and a total of 13.6 g of $C_2Cl_6$ added in 1.7 g portions every five minutes. The ultra-hard carbonaceous particles were washed and dried as in Example 1 producing the final product according to the following reaction:

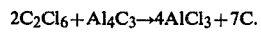

$2C_2Cl_6 + Al_4C_3 \rightarrow 4AlCl_3 + 7C.$

EXAMPLE 5

To the melt system prepared as in Example 1 was added 2.9 g of $Al_4C_3$ and 2 mg of FeS in 18 mg of NaCl as a nucleating agent. These latter ingredients were mixed in the melt system for approximately ten minutes followed by the addition of 1 g of $CBr_4$ and 7 g of $C_2Cl_6$ while allowing the fluid reaction mixture to reflux for approximately 65 minutes at 240° C. Three more additions of $C_2Cl_6$ were made over the next 10 minutes and the suspension was refluxed again for 20 minutes. A final 3 g of $C_2Cl_6$ were added over a 20 minute interval and the suspension again heated for 30 minutes. The ultra-hard carbonaceous particles were then washed and dried as in Example 1.

EXAMPLE 6

The melt system was prepared as in Example 1 to which was added 2.9 g of $Al_4C_3$ and 20 mg of ten percent FeS in NaCl as a nucleating agent. The fluid reaction mixture was stirred at approximately 240° C. for 15 minutes after which a total of 24 g of $CBr_4$ was added in 2 g portions every 5 minutes. The reaction proceeded according to the following equation:

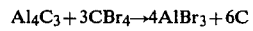

$Al_4C_3 + 3CBr_4 \rightarrow 4AlBr_3 + 6C$ and the ultra-hard carbonaceous particles were filtered, washed and dried according to the manner employed in Example 1.

EXAMPLE 7

The melt system was formed by mixing 10 g of powdered KBr, 21 g of LiCl and approximately 67 g of $AlCl_3$. The mixture was heated to approximately 240° C. and stirred for 1 hour under argon. To the melt system was added 20 mg of $HgCl_2$ as a possible catalyst to which 2.9 g of $Al_4C_3$ was added. After waiting 5 minutes, approximately 1 ml of $C_2Cl_4$ ws added and, 10 minutes later, a second ml of $C_2Cl_4$ was added to the hot melt. The solution was allowed to reflux and, after 10 minutes, 1 g of $CBr_4$ was added. Then, at 10 minute intervals, 1 ml portions of $C_2Cl_4$ were added until a total of 9 ml were in the system. The reactants were heated for 45 minutes, filtered, washed and dried as in Example 1. The reaction proceeded according to the following equation:

$$Al_4C_3 + 3C_2Cl_4 \rightarrow 4AlCl_3 + 9C$$

forming ultra-hard carbonaceous particles.

EXAMPLE 8

The melt system of Example 1 was prepared and to it was added 2.9 g of $Al_4C_3$ and 20 mg of ten percent FeS in NaCl as a nucleating agent. The second reactant was made up of 8 ml $Br_2$ which was added in 0.4 ml portions at 5 minute intervals. The reaction products were filtered, washed and dried as in Example 1 producing a product according to the following equation:

$$Al_4C_3 + 6Br_2 \rightarrow 4AlBr_3 + 3C.$$

EXAMPLE 9

A melt system was prepared according to Example 1 with the addition of 5 g of KI. To this was added approximately 2.88 g of $Al_4C_3$ at 250° C. which was reacted with $CCl_4$ added to the system every five minutes in 0.5 ml amounts totaling 20 additions. The reaction produced ultra-hard particles which were filterd, washed and dried according to the procedure of Example 1.

EXAMPLE 10

A melt system was prepared according to Example 1 with the addition of 5 g of NaF. To the melt system was added approximately 2.88 g of finely ground $Al_4C_3$ to which was added $CCl_4$ in 1 ml amounts every ten minutes totaling 12 additions. The reaction product was filtered, washed and dried according to Example 1 producing the ultra-hard carbonaceous materials of this invention.

EXAMPLE 11

A melt system comprised of 42 g of LiCl and 134 g of $AlCl_3$ was prepared as per Example 1 to which 5.76 g of $Al_4C_3$ having a $-270$ mesh size was added. At a starting temperature of approximately 236° C., Freon 11 ($CCl_3F$) was added in 1 ml amounts every five minutes totaling 23 additions. The reaction product was filtered, washed and dried according to Example 1 producing the ultra-hard carbonaceous materials of the present invention.

EXAMPLE 12

The melt system of Example 1 was prepared to which approximately 2.88 g of $Al_4C_3$ was added having a $-270$ mesh at 242° C. Chlorine gas was then bubbled into the hot melt system at a rate of 0.05 cubic feet per hour for ½ hour. The rate was then increased to 0.1 cubic feet per hour for the next 2½ hours amounting to a total chlorine addition of 10.7 liters. The reaction product was filtered, washed and dried as was shown in Example 1 producing ultra-hard carbonaceous particles according to the present invention.

EXAMPLE 13

A new melt system was prepared by placing 29.2 g of NaCl in a flask which was heated to 180° C. under vacuum for 2 hours and which was allowed to stand overnight under full vacuum. With mechanical stirring under an argon blanket, 67 g of $AlCl_3$ was added to complete the melt system. To this melt was added 2.88 g of $Al_4C_3$ and, as a second reactant, 1 ml of $CCl_4$ was added every 10 minutes to a total of 13 additions. The temperature was maintained above 300° C. producing a reaction product which was filtered, washed and dried according to Example 1 producing the ultra-hard carbonaceous particles of the present invention.

EXAMPLE 14

A new melt system was prepared by placing 37.3 g of KCl in a flask which was heated at full vacuum to 180° C. for 2 hours. The KCl was maintained at full vacuum overnight and, under mechanical stirring, 67 g of $AlCl_3$ was then added to complete the melt. Approximately 2.88 g of $Al_4C_3$ was then added, which was reacted with $CCl_4$ which was in turn added in 1 cc amounts every 10 minutes to a total of 13 additions. As in Example 13, the temperature was maintained above 300° C. producing a reaction product which was filtered, washed and dried according to Example 1. The reaction produced ultra-hard carbonaceous particles according to the present invention.

EXAMPLE 15

To the melt system prepared according to Example 1 was added 2.88 g of $Al_4C_3$ which was reacted with $CCl_2F_2$ at a rate of 0.1 cubic feet per hour. The temperature was maintained between 230°–245° C. while the $CCl_2F_2$ was bubbled into the system for 2 hours. At the end of these additions, the reaction product was filtered, washed and dried according to Example 1 yielding ultra-hard carbonaceous particles according to the present invention.

EXAMPLE 16

A melt system according to Example 1 was prepared. At a temperature of approximately 247° C., 2.88 g of $Al_4C_3$ was added and reacted with $CCl_2F_2$ which was introduced into the hot melt system at a rate of 0.1 cubic feet per hour for 4 hours. The temperature was maintained at approximately 238° C. producing a reaction product which was filtered, washed and dried and which was in the nature of ultra-hard carbonaceous particles.

EXAMPLE 17

A melt system according to Example 1 was prepared. To this was added approximately 2.9 g of $Al_4C_3$ and 20 mg of 10 percent FeS in NaCl, which was heated for an additional 15 minutes. A second reactant comprising $CHBr_3$ was added in 0.5 ml intervals every five minutes to a total of 7.0 ml. The reaction product was filtered, washed and dried producing ultrahard carbonaceous particles according to the following equation:

$$Al_4C_3 + 4CHBr_3 \rightarrow 4AlBr_3 + 6C + CH_4$$

EXAMPLE 18

To the melt prepared according to Example 1 was added 1.5 g of $Al_4C_3$ and 20 mg of FeS in NaCl. A second reactant comprising $CH_2I_2$ was added every five minutes in 0.5 ml amounts with refluxing until a total of 5 ml had been added. The product was then washed and dried producing ultra-hard carbonaceous particles according to the following reaction:

$$6CH_2I_2 + Al_4C_3 \rightarrow 4AlI_3 + 3CH_4 + 6C.$$

As can be seen from the above working examples, ultrahard carbonaceous particles can be produced as the product of a reaction of a metal carbide selected from the group consisting of $Al_4C_3$ and $Be_2C$ with a member selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$ and $X_2$ wherein X and Y are different halogens selected from the group consisting of chlorine, bromine, iodine and fluorine, and wherein A is an integer from 0 to 4, A' is an integer from 0 to 6 and A'' is an integer from 0 to 4, and whrein n is an integer from 0 to 4, n' is an integer from 0 to 6 and n'' is an integer from 0 to 4, wherein A, A', A'', n, n' or n'' is the same integer in any particular member selected and wherein $n+A=4$, $n'+A'=6$ and $n''+A''=4$. In actual reactions which were carried out, the reaction energy was found to be enormously favorable and more than 100 times as great per carbon atom as the graphite-carbon interconversion energy. The need for extremes in either temperature or pressure, conditions which were employed by synthetic diamond and other hard carbonaceous particle fabricators, have been completely eliminated in practicing the present invention.

The reaction was carried out in a hot melt system comprised of a molten solution of more than one metal halide wherein the metals are selected from the group consisting of Group I, Group II and Group III metals of the periodic table and the halides are selected from the group consisting of chlorine, bromine, iodine and fluorine. The present invention also contemplates the use of nucleating agents with lattice constants as close to that of diamond. For example, very fine particles of FeS, Cu, or diamond itself may be employed. The present invention also contemplates the use of a catalyst such as $I_2$.

Each of the ultra-hard carbonaceous products produced according to the above-recited examples was tested for hardness and corresponding abrasiveness. The commonly used Moh's Scale from 1–10, where 1 is talc, 7 is quartz, 9 is corundum and 10 is diamond, is purely a ranking by scratch ability and has no relative quantitative significance. In some grinding tests, diamond is at least 100 times as hard as corundum. When one places a small amount of powdered abrasive on a glass slide, moistens the powder, rubs this against another glass slide for a few seconds, washes the slide and then observes the results under a microscope by reflective light, marked quantitative and qualitative differences between abrasive materials are notable. Corundum or carborundum as fine grits or powders yield, at most, short grooves. These abrasives crumble relatively rapidly and the glass slide quickly assumes a frosted appearance. Fine diamond grits and powders behave totally differently and yield long, highly characteristic, meteoric grooves. Each of the hard carbonaceous products of the above-recited examples displayed at least some tendency to yield these characteristic meteoric grooves when tested.

What is claimed is:

1. Ultra-hard particles having covalently bonded lattice structures composed largely of carbon on an atomic basis and produced by the reaction of $Al_4C_3$ with a member selected from the group consisting of $CH_nX_AY_{(4-n)-A}$, $C_2H_{n'}X_{A'}Y_{(6-n')-A'}$, $C_2H_{n''}X_{A''}Y_{(4-n'')-A''}$ and $X_2$ wherein X and Y are different halogens selected from the group consisting of chlorine, bromine, iodine and fluorine, and wherein A is an integer from 0 to 4, A' is an integer from 0 to 6 and A'' is an integer from 0 to 4, and wherein n is an integer from 0 to 4, n' is an integer from 0 to 6 and n'' is an integer from 0 to 4, wherein A, A', A'', n, n' or n'' is the same integer in any particular member selected and wherein $n+A=4$, $n'+A'=6$ and $n''+A''=4$, said reaction being carried out at temperatures from about 100° to 700° C. and pressures from about 0.1 to 100 atmospheres or higher in a hot melt system having substantially no solvency capability for carbon while exhibiting substantial solvent and penetrant capability for $Al_2O_3$ and hydroxy aluminous complexes which naturally form on the surface of aluminum or aluminum carbide in the presence of oxygen or water, said hot melt system comprising a molten solution of more than one metal halide wherein the metals are selected from the group consisting of Group I, Group II and Group III metals of the periodic table and the halides are selected from the group consisting of chlorine, bromine, iodine and fluorine.

2. The ultra-hard particles of claim 1 wherein the hot melt system is substantially free of oxidizing anions and hydrogen containing anions.

3. The ultra-hard particles of claim 1 wherein the hot melt system is substantially anhydrous and substantially free of hydroxyl groups.

4. The ultra-hard particles of claim 1 wherein a crystal nucleating agent is included in the reactants.

5. The ultra-hard particles of claim 4 wherein the crystal nucleating agent is a member of the group consisting of FeS, Cu and diamond.

6. The ultra-hard particles of claim 1 wherein one of the metal halides comprises $AlX_3$, wherein X is selected from the group consisting of Cl, Br, I and F.

7. The ultra-hard particles of claim 6 wherein the metallic halide is selected from the group consisting of alkaline halides and alkaline earth halides.

8. The ultra-hard particles of claim 7 wherein said hot melt comprises a molten solution of $AlCl_3$ and $LiCl$.

* * * * *

UNITED STATES PATENT AND TRADEMARK OFFICE
CERTIFICATE OF CORRECTION

PATENT NO. : 4,275,050
DATED : June 23, 1981
INVENTOR(S) : Frederic A. French et al.

It is certified that error appears in the above-identified patent and that said Letters Patent are hereby corrected as shown below:

In the Abstract:

Line 6, correct the formula "$CH_nX_AY_{(4-n)}-A$," to read --$CH_nX_AY_{(4-n)}-A$--

Line 7, correct the first letters "[sub] C2" to read --$C_2$--.

In the Specification:

Col. 1, line 19, correct "guest" to --quest--.

Col. 1, line 64, correct "nd" to --and--.

Col. 5, line 1, correct "ws" to --was--.

Col. 7, line 13, correct the "$Y_{(6-n")}$" in the first formula to read --$Y_{(6-n')}$--.

Col. 7, line 18, correct "whrein" to --wherein--.

In the Claims:

Col. 8, line 13, correct the last formula on that line, namely, "$C_2H_{n"}X_A$," to read --$C_2H_{n"}X_{A"}$--.

Signed and Sealed this

Sixth Day of April 1982

[SEAL]

Attest:

GERALD J. MOSSINGHOFF

Attesting Officer     Commissioner of Patents and Trademarks